United States Patent [19]

Nakamura et al.

[11] Patent Number: 4,949,737
[45] Date of Patent: Aug. 21, 1990

[54] WIG HAVING SHAPE RETAINING ELEMENT

[75] Inventors: Yukimichi Nakamura; Ryuji Teratoko, both of Shinjuku, Japan

[73] Assignee: Aderans Co., Ltd., Tokyo, Japan

[21] Appl. No.: 378,223

[22] PCT Filed: Nov. 4, 1988

[86] PCT No.: PCT/JP88/01121
§ 371 Date: Jun. 21, 1989
§ 102(e) Date: Jun. 21, 1989

[87] PCT Pub. No.: WO89/04122
PCT Pub. Date: May 18, 1989

[30] Foreign Application Priority Data

Nov. 4, 1987 [JP] Japan .................... 62-278940

[51] Int. Cl.⁵ .................... A41G 5/00
[52] U.S. Cl. .................... 132/54; 132/53
[58] Field of Search .................... 132/53, 54, 55, 56

[56] References Cited

U.S. PATENT DOCUMENTS

| 2,781 | 9/1842 | Deville | 132/54 |
| 1,424,845 | 8/1922 | Nolan | 132/53 |
| 3,645,279 | 2/1972 | Imre | 132/53 |
| 3,665,940 | 5/1972 | Schordalides et al. | 132/53 |
| 3,788,332 | 1/1974 | Abbott et al. | 132/54 |

Primary Examiner—Gene Mancene
Assistant Examiner—Michael Lynch
Attorney, Agent, or Firm—Nixon & Vanderhye

[57] ABSTRACT

A wig having a shape retaining element for preventing turning-up, distortion and so on of a wig base. This shape retaining element (12) is made of a shape memory alloy whose transformation temperature (Af point) is higher than the surrounding temperature at a location between a surface of a user's head and the wig base during a period for which the wig (10) is worn on the head. The shape retaining element is arranged in position on the side of an inner surface or an outer surface of the wig base (11). When the shape retaining element is deformed into a corrugated configuration due to several uses, the shape retaining element is heated to a temperature equal to or higher than the transformation temperature, whereby the shape retaining element is restored to a beforehand stored shape. Thus, the wig can repeatedly be worn under new condition.

11 Claims, 6 Drawing Sheets

WIG HAVING SHAPE RETAINING ELEMENT

TECHNICAL FIELD

The present invention relates to wigs and, particularly, to a wig having a shape retaining element for preventing turning-up, distortion and so on of a wig base.

BACKGROUND ART

Conventionally, a method has widely been used in which a scalp and the hiar and an inner surface of a wig base are fixed to each other by means of adhesive, adhesive double-coated tapes or the like, in order to prevent turning-up, distortion and so on of the wig base. In this method, however, wearing and detachment of the wig have been extremely troublesome. In addition, the use of the wig has been accompanied with unpleasant feeling. Particularly, if the adhesive double-coated tapes are employed, several attachments and detachments of the wig have weakened the adhesive strength of the adhesive double-coated tapes. Therefore, it has been required to replace the adhesive double-coated tapes frequently.

In view of the above, there is a wig in which a shape retaining element made of an elongated metal element such as a wire or the like or a metal plate is arranged along a curved configuration of a wig base at a part thereof tending to be turned up such as, for example, a forehead section, each sideburns section, a nape section or the like. When the wig is worn, the shape retaining element is curved with hands, whereby the wig base is fitted to a head contour of a user.

However, the wig provided with such shape retaining element has had the following problems. That is, since, at attachment and detachment of the wig, the shape retaining element is inevitably deformed so as to be curved toward the outside and the inside, repeated use of the wig causes the shape retaining element to be deformed into a corrugated configuration, making it impossible to restore the shape retaining element to the original smooth configuration. If the shape retaining element is arranged on the wig base while the shape retaining element presents the corrugated configuration, the fit feeling of the wig is marred conversely. In addition, for example, the forward end of each sideburns section, the forehead section, the nape section of the like of the wig is floated up in a corrugated fashion by the shape retaining element.

On the other hand, a wig, which utilizes a shape memory alloy as the shape retaining element, is disclosed in Japanese Patent Application Laid-Open No. Sho 62-215003. The patent publication describes as follows. That is, according to this technique, a shape memory alloy, in which its shape is beforehand stored into such a curved configuration as to be brought into close contact with the head, is arranged on the wig base. With the arrangement, when the wig is attached, the wig can be worn in close contact with the head under the shape restoring action and the super elastic action of the shape memory alloy. Further, even if washing of the hair of the wig is repeated, the wig does not get out of shape. That is, the technique is such that, even if the shape memory alloy is suitably deformed at the ordinary temperature before the wig is worn on the head, the shape memory alloy is restored to the stored shape under the influence of the bodily temperature after the wig has been worn, so that the wig is brought into conformity with the head. The technique attempts to improve fit feeling during wearing of the wig.

However, the contour of the head differs from person to person, and the curved configuration of the head does not depict a smooth curved surface, but is normally curved convexly while presenting slight undulation. Accordingly, it is practically impossible to control the processing of shape memory into a curved configuration which is precisely in conformity with each user's head contour. By this reason, if the shape memory alloy is arranged at the peripheral edge of the wig base along the hairline of each sideburns section, the forehead section or the like, restoring to the stored shape causes the hairline to be floated up from the scalp, depending upon the part, to form a gap, so that the hairline becomes unnatural. Further, if, although accidental, shape memory processing of the shape memory alloy can be effected into a curved configuration accurately in conformity with the head contour of the user, the following problem arises. That is, when this processing is to be effected, a head contour mold of each user must individually be manufactured, and it is required to use the mold to store the shape in the shape memory alloy at high temperature of 400 to 600° C. Accordingly, the expensive head contour mold of each user must be manufactured each time, so that the manufacturing cost of the shape retaining element increases extremely. Further, the head is always tightened under the super elastic action of the shape memory alloy during a period for which the wig is worn. This results in stiffness and headache so that the wearing of the wig is accompanied with unpleasant feeling.

In view of the above, it is an object of the invention to provide a wig in which, if repeated use of the wig causes a shape memory element to be deformed into a corrugated configuration, the wig is immersed in hot water, or hot air is applied to the wig by a drier or the like, whereby the deformation can easily be rectified, making it possible to obtain fit feeling of the wig for a long period of time and to prevent turning-up of a wig base.

DISCLOSURE OF THE INVENTION

According to the invention, the above object is achieved by a wig formed in such a manner that a multiplicity of hairs are implanted to a convex outer surface of a wig base made of an artificial skin or a net, wherein at least one shape retaining element arranged in position on an concave inner surface or the convex outer surface of the wig base along a curved configuration of the wig base is made of a shape memory alloy having a transformation temperature higher than surrounding temperature at a location between a surface of a user's head and the inside of said wig base when the wig is worn on the head.

The wig according to the invention is such that the shape memory alloy is stored, preferably, into a linear shape or an optional curved shape, or a curved shape substantially corresponding to a curved configuration of the wig base, or a curved shape having a radius of curvature smaller than the curved configuration of the wig base.

According to the invention, the shape retaining element made of the shape memory alloy is employed as a shape retaining element for the wig base, and the shape memory alloy is so set as to have the transformation temperature higher than the temperature of the wig base under the condition that the wig is worn. Therefore, the shap memory alloy can optionally be deformed during a period for which a user wears the wig. Accordingly, similarly to the case of the conventional wig having a shape-retaining element made of metal wire, metal plate or the like, the shape retaining element is suitably deformed so as to be in conformity with a curved state of a head, whereby it is possible to fit the wig base to the head contour.

Further, if repeated use causes the shape retaining element to be deformed into a corrugated configuration, hot water is poured on an area where the shape retaining element of the wig is arranged, or hot air is applied to the area by a hair drier, to heat the shape memory alloy forming the shape retaining element to a temperature equal to or higher than the transformation temperature of the shape memory alloy. By doing so, the shape memory alloy is restored to a stored shape, for example, to a linear or optionally curved shape or a curved shape substantially corresponding to the curved configuration of the wig base or a curved shape having a radius of curvature smaller than that of the curved configuration. Thus, there are obtained advantages similar to those at the time the shape retaining element is replaced by new one. At the time, if the shape memory processing of the shape memory alloy is so effected as to store a linear shape in the shape memory alloy, the shape retaining element is curved into any suitable configuration when the wig is worn, such that the wig is fitted to the user's head. If, however, the shape memory alloy is processed into a curved shape, the wig can be worn as it is without curving the shape retaining element into a suitable configuration with hands. In either case, it is possible to obtain fit feeling extremely easily.

BEST MODE FOR CARRYING OUT THE INVENTION

Figure 1:
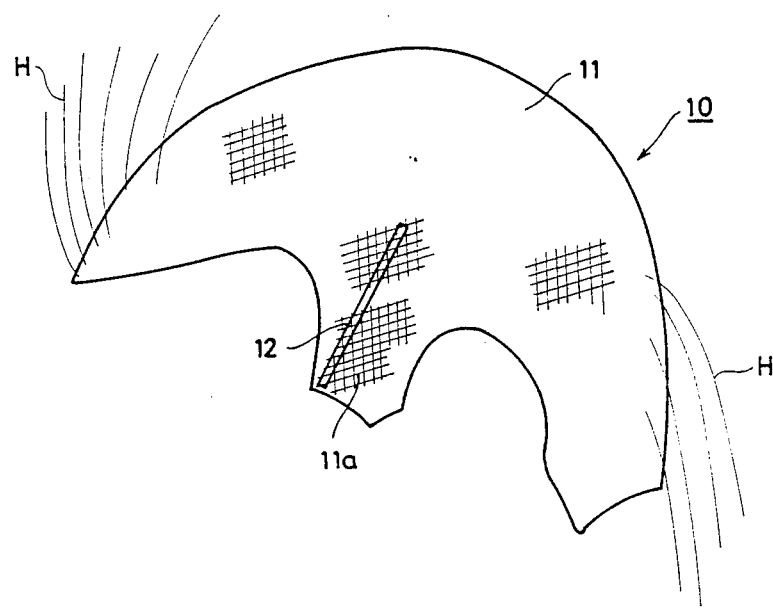
FIG. 1 is a diagrammatic side elevational view of an embodiment of a wig according to the invention.

The invention will be described in more detail on the basis of several embodiments shown in the drawings.

FIG. 1 shows an embodiment of a wig according to the invention. The wig 10 is basically composed of a wig base 11 formed correspondingly to a head contour of a user, and a multiplicity of hairs H (only a portion illustrated) made of human hairs and/or artificial hairs which are implanted on an outer surface of the wig base 11.

The illustrated wig 10 is formed into a whole wig having the wig base 11 made of a net whose outer configuration extends along hairlines of a forehead section, the opposite sides and a nape section, which serve as hairlines of the hair, so as to cover the entire head including the hairlines. The wig base 11, which is applicable to the invention, is not limited to the above one made of the net, but the wig base may be any of one mainly having an artificial skin made of nonrigid synthetic resin or one formed by a combination of an artificial skin and a net.

Figure 2:
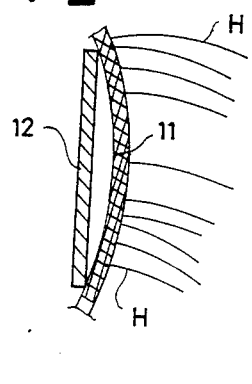
FIG. 2(A) is a cross-sectional view of a principal portion of an example in which a shape retaining element is arranged on the side of a concave inner surface of a wig base.
FIG. 2(B) is a cross-sectional view of a principal portion of an example in which the shape retaining element is arranged on the side of a convex outer surface of the wig base.
FIG. 2(C) and 2(D) are cross-sectional views of principal portions each showing that the shape retaining element is accommodated in a pocket formed on the side of the inner surface of the wig base made of a net or an artificial skin.
Figure 2:
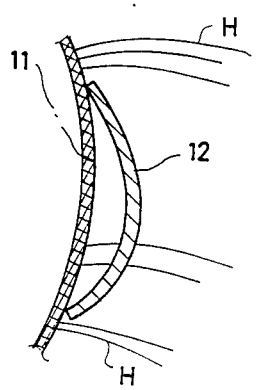
Figure 2:
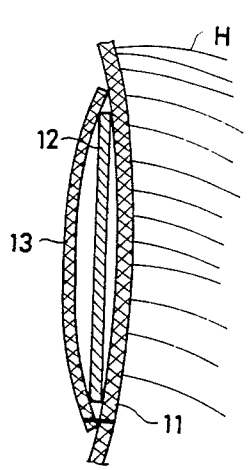
Figure 2:
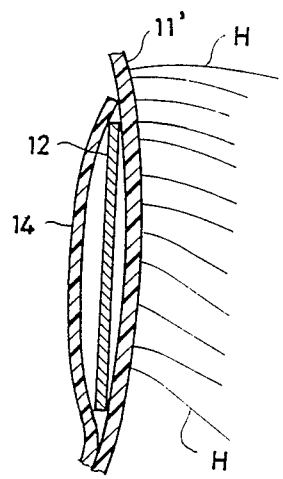

At a predetermined position on the wig base 11, for example, on the side of a concave inner surface of the wig base 11 corresponding to each of sideburns sections 11a on the opposite sides (only the left-hand side shown), a shape retaining element 12 is arranged for preventing turning-up, distortion and the like of the sideburns sections 11a during a period for which a user wears the wig. When the shape retaining element 12 is mounted to the predetermined position on the wig base 11, for example, to the aforesaide sideburns section 11a, the shape retaining element 12 is generally arranged on the side of the concave inner surface of the wig base 11 as shown in FIG. 2(A). However, the shape retaining element 12 may be arranged on the side of a convex outer surface of the wig base 11 as shown in FIGS. 2(B). In this case, the shape retaining element 12 is required to be arranged on the convex outer surface of the wig base 11 before the hairs H are implanted to the wig base 11. Accordingly, mounting of the shape retaining element 12 is troublesome, and the shape retaining element 12 tends to be viewed through gaps among the implanted hairs. As shown in FIG. 1, therefore, it is preferable that the shape retaining element is arranged on the side of the concave inner surface of the wig base 11. In this case, the shape retaining element 12 is fixed directly to the wig base by means of stitching, bonding or the like, preferably in a detachable maner.

On the other hand, as shown in FIG. 2(C), for example, an accommodating pocket 13 is formed at a part on the side of the concave inner surface of the wig base 11 to which the shape retaining element 12 is to be mounted, and the shape retaining element 12 is accommodated in the pocket 13. By doing so, if the shape retaining element 12 must be replaced by another one, positioning is not required to be effected each time of the replacement and, therefore, this is convenient. Further, since the shape retaining element 12 is not directly abutted against the scalp, the scalp is prevented from being damaged. As shown also in FIG. 2(C), the accommodating pocket 13 should be formed in such a manner that, if the material of the wig base 11 is a net, the same net or similar one is stitched or the like to the wig base 11 to form the accommodating pocket 13. On the other hand, as shown in FIG. 2(D), if a wig base 11' made of artificial skin is used, a similar film may be stuck, fusion-bonded or the like to form a pocket 14.

The shape retaining element 12 is made of a shape memory alloy having its transformation temperature (Af point, that is, austenite transformation terminating temperature) which is higher than that at a location between the wig base 11 and the head covered with the wig base 11 when the user wears the wig. Generally, the transformation temperature is within, for example, a range of from about 36° C to 80° C, preferably, a range of from about 39° C to 60° C. For example, memory processing is carried out such that a stored shape of the shape retaining element 12 is linear as shown in FIG. 2(A).

Here, the shape memory alloy applicable to the invention is an alloy in which, once the shape memory alloy stores a predetermined shape by means of storing heat treatment, if the shape memory alloy is deformed, the shape memory alloy is restored to its stored shape merely by appropriately heating the shape memory alloy. The type of the shape memory alloy is not particularly limited. For example, however, it is possible to suitably use a copper alloy such as Cu-Zn-Al or the like, a Ni-Ti alloy sold at a market by Furukawa Denki Kogyo Kabushiki Kaisha as "FURUKAWA NT ALLOY" (trade name), or the like. The shape memory processing of this shape memory alloy is effected such that material is subject to heat treatment normally for 30 to 60 minutes at 400 to 600° C.

In the invention, as described above, the transformation temperature of the shape memory alloy is set to a value higher than the surrounding temperature of the head covered with the wig base 11 during a period for which the user wears the wig. For example, the transformation temperature is set to a value equal to or higher than about 36° C, preferably, within a range of from about 39 to 60° C. This setting of the temperature range has been found out by inventors as results of various studies in consideration of the external environment, easiness of restoring processing to the stored shape, and so on.

That is, the inventors of this application have conducted various experiments, and have found out that the temperature of the wig base (made of net) of the worn wig in contact with the head varies depending upon a change in the outside air temperature as indicated in the below table 1.

TABLE 1

| OUTDOOR AIR | | TEMPERATURE INSIDE WIG (°C.) | | |
|---|---|---|---|---|
| TEMPERATURE (°C.) | HUMIDITY (%) | MEANS VALUE* | MAXIMUM VALUE | MINIMUM VALUE |
| 0 | 50-65 | 19.2 | 25.5 | 13.4 |
| 10 | 50-65 | 30.8 | 32.5 | 29.6 |
| 20 | 50-65 | 32.6 | 33.3 | 31.5 |
| 30 | 50-65 | 34.9 | 35.4 | 34.4 |
| 40 | 80-90 | 38.1 | 38.4 | 37.8 |

*MEAN VALUE: Mean value at the time temperature was measured five times under each outdoor air temperature.
MEASUREMENT CONDITION: Whole wig made of net was used to measure temperature in the vicinity of both sideburns sections under the stationary condition.

From the above results, it will be seen that the temperature at a location between the head and the wig base remains within a range of from about 13.4 to 35.4° C under the condition of 0 to 30° C of the outdoor air temperature, and that the temperature at the location between the head and the wig base normally remains at about 38.4° C to the maximum under the extremely severe conditions of the outdoor air temperature of 40° C and the humidify of about 80%. Accordingly, it is estimated that, even if the shape memory alloy serving as the shape retaining element is heated by the surface temperature of the head and the outdoor air temperature, usually there is almost no case where the temperature (about 38.4° C) is exceeded. Thus, by selecting a shape memory alloy whose transformation temperature is set to about 39° C or above, the shape memory alloy is not restored to its specific stored shape during a period within which the user wears the wig, unless the temperature on the inside of the wig base exceeds about 39° C. In this manner, the shape retaining element can be maintained at the deformed state along the head contour.

Furthermore, the transformation temperature of the shape memory alloy employed in the invention is set to a value equal to or lower than about 80° C, preferably, to 60 to 40° C. This is due to easiness of handling when the shape retaining element curved in a corrugated fashion is restored to the original stored shape and, in addition thereto, the above is to prevent the wig base and the hair from being damaged due to immersion into hot water and application of hot air.

In contradistinction to the above, according to the prior art disclosed in the aforesaid Japanese Patent Application Laid-Open No. Sho 62-215003, it is required to set the transformation temperature to a value lower than the bodily temperature of the head and, therefore, it is required to reset the transformation temperature in accordance with a change in the external using condition. For example, the experiments conducted by the inventors of this application have revealed that there may be a case where the temperature at a location between the head and the wig base is brought to about 13° C under the condition that the air temperature is 0° C and the humidity is 50%. As a result, in the above prior art, it is required to set the transformation temperature to a considerably low value. Generally, the hardness of the shape memory alloy varies depending upon a change in temperature. A state equal to or lower than the transformation temperature is called a martensitic phase, and a state equal to or higher than the transformation temperature is called an austenitic phase. From the viewpoint of the physical properties, in the martensitic phase, the lower the temperature, the softener the shape memory alloy, while, in the austenitic phase, the higher the temperature, the more the shape memory alloy becomes hard so that the shape memory alloy has a super elastic property. Therefore, the aforesaid prior art utilizes the shape memory alloy under the condition that the shape memory alloy has been restored to its stored shape, that is, at the austenitic phase. By this reason, the wig is worn on the head under the condition that the shape memory alloy is hard having the super elastic property, so that the wearing of the wig is accompanied with unpleasant feeling due to tightening as described previously.

Figure 3:
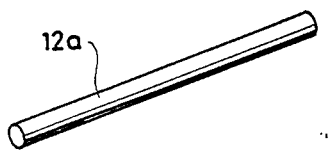
FIGS. 3(A) and 3(B) are perspective views each showing the shape retaining element having a circular cross-sectional configuration or a rectangular cross-sectional configuration.

The invention can employ the shape memory alloy as described above which is formed into a wire-like shape or a plate-like shape. For example, the shape memory alloy is formed into a wire 12a having a circular cross-sectional configuration whose diameter is 0.1 to 2 mm (refer to FIG. 3(A)), or the shape memory alloy is formed into a plate 12b having a rectangular cross-section on the order of 2 to 10 mm in width and 0.2 to 2 mm in thickness (refer to FIG. 3(B)). It is perferable that the shape retaining element 12a formed into a wire-like shape is mainly arranged at the forehead section or the nape section of the wig base 11, while the shape retaining element 12b formed into a plate-like shape is mainly arranged at the top head section or the sideburns section. In either case, an excessive thickness is cross-section is not preferable because the thickness of the wig base appears. In this connection, the length of the shape retaining element 12 can optionally be set depending upon parts to be arranged.

The wig according to the invention is constructed as above. When the wig is worn on a user's head, the wig 10 first rests in position on the head, and is worn on the head by means of, for example, bonding elements, adhesive or the like, not shown, which are or is provided on the periphery of the wig base 12.

Here, in order to prevent turning-up, floating-up and so on of each sideburns section 11a of the wig base 11, the shape retaining element 12 made of the shape memory alloy mounted to the wig base 11 is so deformed as to be appropriately curved inwardly with hands, so that the shape retaining element 12 is given such a curved configuration as to have a radius of curvature smaller than the curved configuration of the wig base 11. By doing so, the forward end of each sideburns section 11a of the wig base 11 is fitted to a corresponding one of the sideburns of the user due to the aforesaid deformation.

Figure 4:
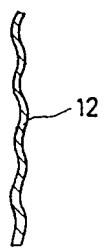
FIG. 4 is a perspective view of the shape retaining element which is deformed by the use.
Figure 3:
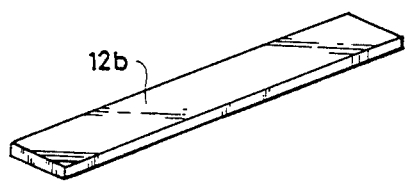

On the other hand, if attachment and detachment of the wig 10 are repeated curing the use for a long period of time, the shape retaining element 12 is given the curved configuration each time the wig is worn, so that the shape retaining element 12 is gradually deformed into a corrugated configuration with respect to the surface of the wig base 11 as shown in FIG. 4. In this case, the wig 10 is detached from the user's head, and hot water is poured on the region where the shape retaining element 12 of the wig 10 is arranged, or hot air is applied to the region by a hair drier, to heat the shape retaining element 12 to a temperature level equal to or higher than the transformation temperature (Af point) of the shape memory alloy of which the shape retaining element 12 is made. By doing so, the shape retaining element 12 is restored to the stored shape, for example, to a straight shape. Therefore, a suitable curved configuration is again given to the shape retaining element 12 when the wig 10 is worn, similarly to a new shape retaining element. Thus, the forward end of each sideburns section 11a of the wig base 11 is fitted to a corresponding one of the sideburns of the user.

In the above embodiment, the case has been described where the shape memory alloy forming the shape retaining element 12 has its stored shape which is straight. However, any optional curved shape may be stored in the shape memory alloy. For example, as shown in FIG. 2(B), if the shape memory alloy has its stored shape which is a curved shape having a radius of curvature smaller than the curved configuration of the wig base 11, the shape retaining element 12 is heated to a temperature equal to or higher than the Af point of the shape memory alloy forming the shape retaining element 12, whereby the shape retaining element 12 is restored to the stored shape, that is, the curved shape having the radius of curvature smaller than the curved configuration of the wig base. Therefore, when the wig is worn subsequently, each sideburns section 11a of the wig base 11 is exactly fitted to a corresponding one of the sideburns of the user, so that it is dispensed with to give an appropriate curved configuration to the shape retaining element 12 when the wig 10 is worn. Further, even if shape memory of the shape retaining element 12 is memory-processed to a radius of curvature corresponding to the curved configuration of the wig base 11, the wig can be fitted to the user's head similarly to the above.

In connection with the above embodiment, the case has been described where the shape retaining element 12 made of a single shape memory alloy is arranged at each of the sideburns sections 11a of the wig base 11 forming the wig 10. However, the embodiment is not limited to the case, and an appropriate number of shape retaining elements may be arranged at parts where turning-up, floating-up and so on of the wig base tend to occur.

Figure 5:
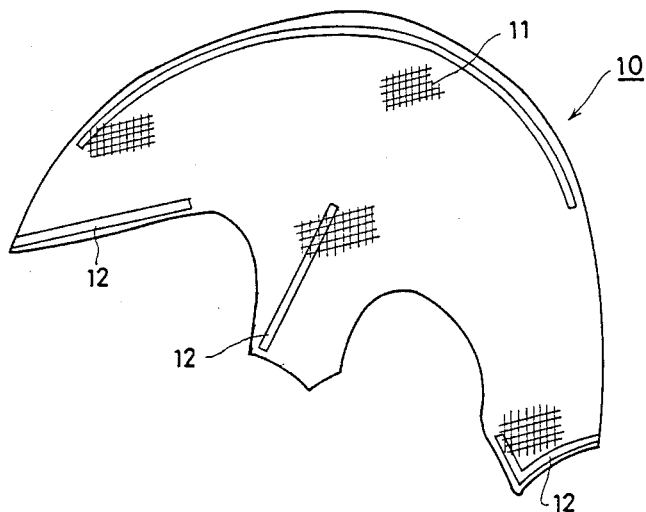
FIGS. 5 through 7 are diagrammatic side elevational views showing other embodiments of the wig according to the invention.
Figure 6:
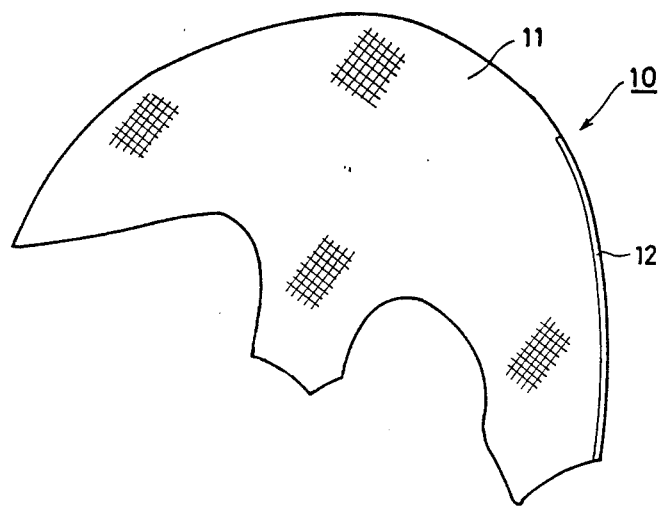

For example, as shown in FIG. 5, in addition to the right-hand and left-hand sideburns sections, a plurality of shape memory alloys serving respectively as shape retaining elements 12 may be arranged along the forehead section and the lower edge of the nape section. Further, usual metallic shape retaining elements 14 made of copper wire, copper plate or the like may be arranged at parts where it is not so much required to deform the shape retaining elements each time the wig is used, for example, at a part extending from the forehead section to the top head section.

Figure 7:
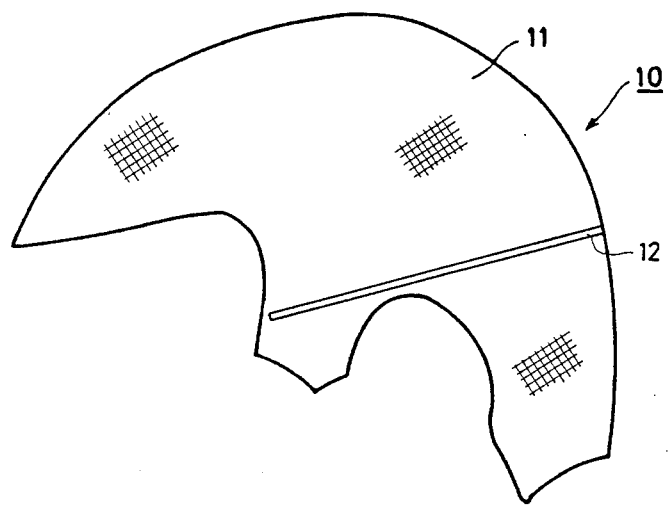
Figure 8:
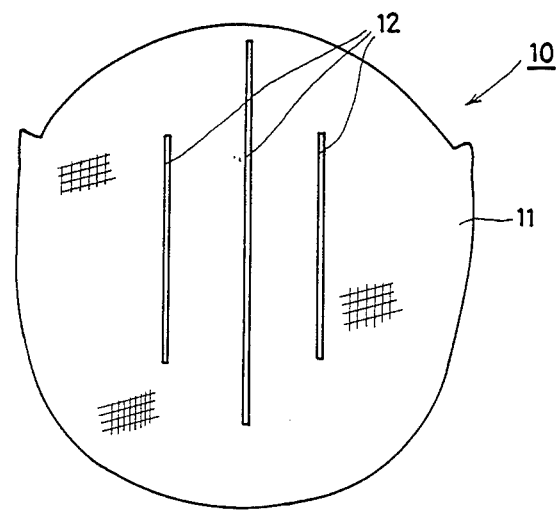
FIGS. 8 and 9 are diagrammatic front elevational views of another embodiment of the wig according to the invention, as viewed from the concave inner surface of the wig.
Figure 9:
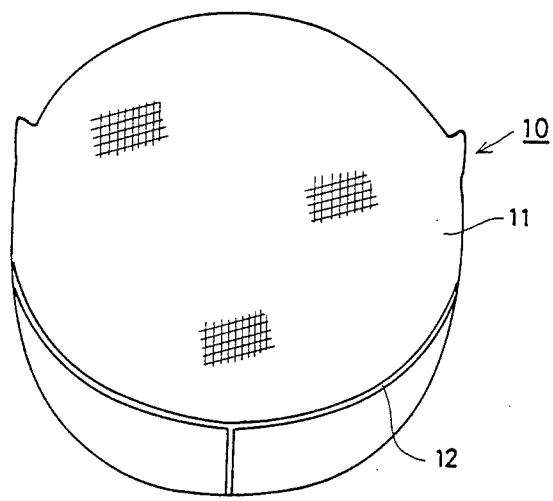

Furthermore, as shown in FIGS. 6 through 9, an optional number of shape retaining elements 12 each made of the shape memory alloy having an optional size can freely be mounted to optional positions on the inner surface or the outer surface of the wig base 11. Specifically, the shape retaining element 12 can be so mounted as to extend along the center of the occiput section of the wig base 11 forming the wig 10 (FIG. 6), and as to connect both the ear upper sections to each other substantially horizontally (FIG. 7). The shape retaining elements can be so mounted as to extend from forehead section to the top head section in parallel relation to each other (FIG. 8). Further, the shape retaining elements can be so mounted as to horizontally connect both the ear upper sections to each other and, subsequently, to extend from the central portion of the occiput section downwardly to the nape section (FIG. 9).

Figure 10:
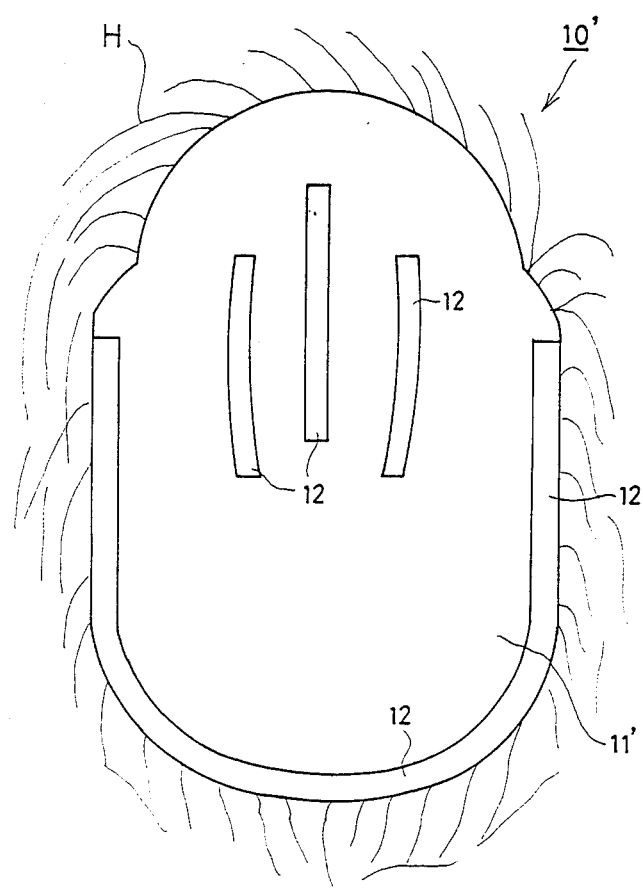
FIG. 10 is a diagrammatic front elevational view of a partial wig according to the invention, as viewed from a concave inner surface of the partial wig.

Moreover, the above examples show the case of the whole wig 10. As shown in FIG. 10, however, an appropriate number of shape retaining elements 12 each made of the shape memory alloy can be applied to a partial wig 10' at suitable locations, and it will be clear that there are obtained advantages wholly similar to those mentioned previously.

As described above, according to the wig having the shape retaining element made of the shape memory alloy, to which the invention relates, if the shape retaining element has been deformed into a corrugated configuration because of the repeated use, hot water is poured on a region of the wig where the shape retaining element is arranged, or hot air is applied to the region by a hair-drier, to heat the shape retaining element to a temperature equal to or higher than the transformation temperature of the shape memory alloy forming the shape retaining element, whereby the shape memory alloy is restored to its predetermined stored shape. Accordingly, it is possible to obtain advantages similar to those at the time the shape retaining element is replaced by new one. Thus, there can be provided a wig high in durability in which fit feeling is good for a long period of time, and turning-up, floating-up and so on are prevented.

What is claimed is:

1. A wig comprising a curved wig base, hair implanted to a convex outer surface of said wig base, and at least one shape retaining element arranged in position on at least one of a concave inner surface and the convex outer surface of said wig base, characterized in that
the at least one shape retaining element is made of a shape memory alloy having a transformation temperature which is higher than a temperature at a location between a surface of a user's head and said wig base during a period for which the wig is worn on the head.

2. A wig according to claim 1, characterized in that said shape retaining element made of the shape memory alloy has a stored shape which is straight.

3. A wig according to claim 1, characterized in that said shape retaining element made of the shape memory alloy has a stored shape which is an optional curved shape.

4. A wig according to claim 1, characterized in that said shape retaining element made of the shape memory alloy has a stored shape which is a curved shape corresponding substantially to a curved configuration of the wig base.

5. A wig according to claim 1, characterized in that said shape retaining element made of the shape memory alloy has a stored shape which is a curved shape having a radius of curvature smaller than a curved configuration of the wig base.

6. A wig according to claim 1 characterized in that said shape retaining element made of the shape memory alloy is formed into a wire-like shape having a circular cross-sectional configuration of 0.1 to 2 mm in diameter.

7. A wig according to claim 1 characterized in that said shape retaining element made of the shape memory alloy is formed into a plate-like shape having a rectangular cross-sectional configuration of 2 to 10 mm in width and 0.2 to 2 mm in thickness.

8. A wig according to claim 7, characterized in that said shape retaining element made of the shape memory alloy has the transformation temperature which is set to a range of from about 39 to 60° C.

9. A wig according to claim 1, characterized in that said shape retaining element made of the shape memory alloy has the transformation temperature which is set to a value equal to or higher than 36° C.

10. A wig according to claim 1, characterized in that said wig base is made of an artificial skin of nonrigid synthetic resinous material.

11. A wig according to claim 1, characterized in that said wig base is made of a net high in air permeability.

* * * * *